May 15, 1962   F. W. SCHULTE ETAL   3,034,383
SYNCHROMESH GEAR AND METHOD AND APPARATUS FOR MAKING THE SAME
Filed March 25, 1957   2 Sheets-Sheet 1

INVENTOR.
Heinz Weickell, Wilhelm Rosenkranz, e
Friedrich Wilhelm Schulte
BY Michael S. Striker
agt.

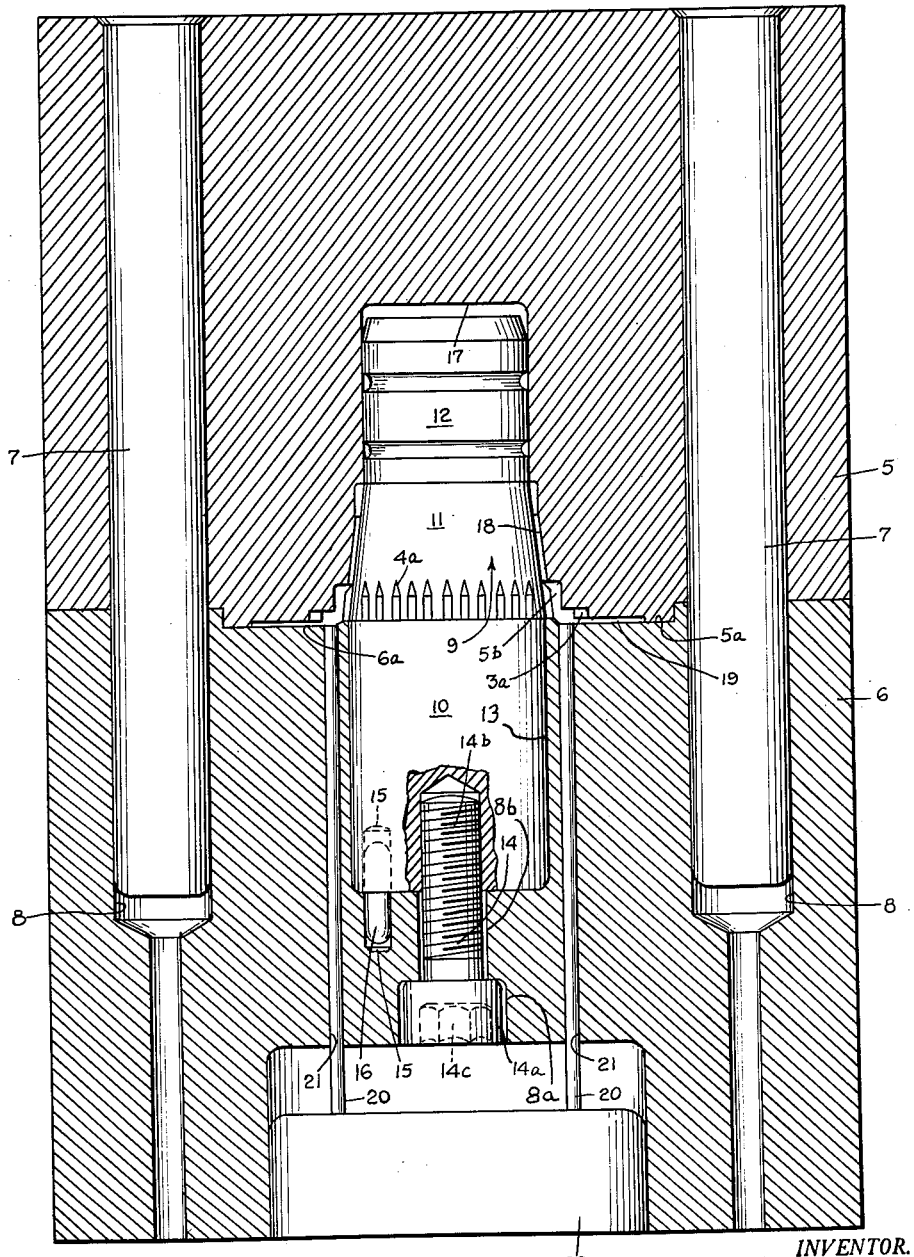

3,034,383
SYNCHROMESH GEAR AND METHOD AND
APPARATUS FOR MAKING THE SAME
Friedrich Wilhelm Schulte, Heinz Wiechell, and Wilhelm Rosenkranz, Meinerzhagen, Westphalia, Germany, assignors to Otto Fuchs Kommandit - Gesellschaft, Meinerzhagen, Westphalia, Germany
Filed Mar. 25, 1957, Ser. No. 648,288
6 Claims. (Cl. 78—45)

The present invention relates to a synchromesh gear and a method and apparatus for making the same.

More particularly, the present invention relates to a synchromesh gear or the like for use in a speed change device or the like, which synchromesh gear is produced by a single pressing, as opposed to machining, operation.

Heretofore, synchromesh gears which are usually tubular in shape and have an outer gear ring and inner longitudinal grooving or flutes, were required to be machined, and great care had to be taken not only to form the gear ring and the grooving accurately but also to maintain the proper angular relationship between the gear ring and the grooving.

It is therefore an object of the present invention to overcome the above disadvantages by providing a press-formed synchromesh gear which requires no machining.

It is another object of the present invention to provide a synchromesh gear which is formed by a single process step which does not include the removal of any material, such as would be the case if the gear were to be machined.

It is yet another object of the present invention to provide a method of press-forming a tubular work piece into a finished synchromesh gear.

The objects of the present invention also include the provision of a press which is capable of producing a finished synchromesh gear by a single press-forming operation.

With the above objects in view, the present invention mainly resides in a press-formed tubular synchromesh gear, as well as in a method of making such a gear which method comprises the step of press-forming an outer gear ring and inner longitudinal grooving on a work piece.

The present invention further resides in a press for press-forming from a tubular work piece a synchromesh gear or the like having an outer gear ring and inner longitudinal grooving, which press incorporates a pair of cooperating press members that are movable toward and away from each other and that are adapted to receive and press between themselves a tubular work piece, and die means operatively associated with the press members for forming the outer gear ring and the inner longitudinal grooving on the work piece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a sectional view of a press adapted to produce a synchromesh gear such as is shown in FIGS. 1 and 2.

Figure 1:
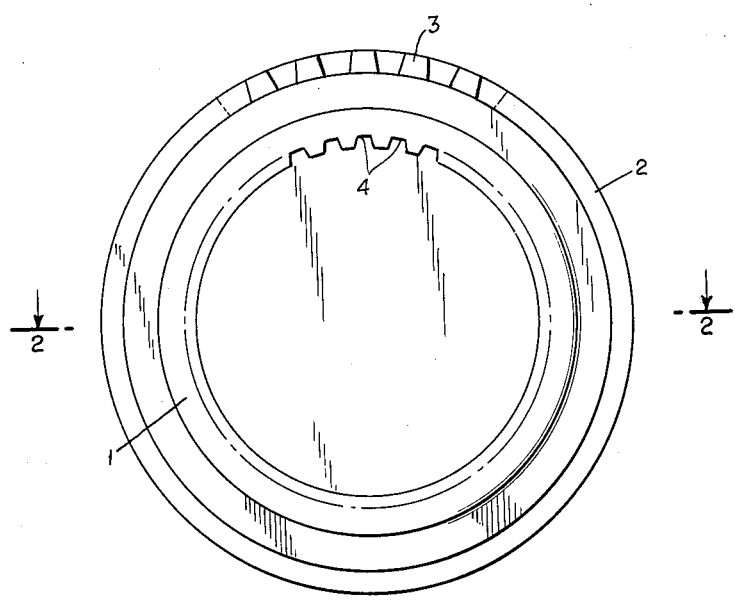
FIG. 1 is a plan view of synchromesh gear produced in accordance with the present invention.
Figure 2:
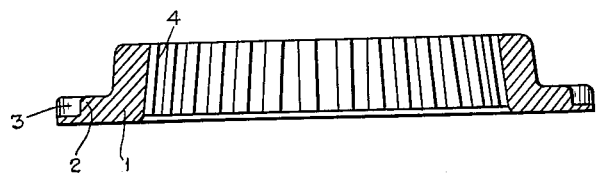
FIG. 2 is a sectional view taken along line 2—2 of FIG. 1.

Referring now to the drawings, and to FIGS. 1 and 2 thereof in particular, there is shown a synchromesh gear which may be press-formed from a tubular work piece. The gear is composed of a tubular gear body 1 formed with a flange portion 2 which, in turn, is formed with an outer gear ring 3. The gear body is also formed with inner longitudinal grooving 4 which extends throughout the entire axial length of the gear body.

The teeth of the gear ring and the flutes of the grooving must be formed with a certain high degree of accuracy. Furthermore, the relative angular position between the gear ring and the grooving must be kept within very close tolerances, and FIG. 3 illustrates a press capable of press-forming the synchromesh gear illustrated in FIGS. 1 and 2 in such a manner that the gear will be properly formed and, furthermore, in such a manner that the gear will require no machining. The press is composed of cooperating upper and lower press members 5 and 6 which are movable toward and away from each other. This may be accomplished in any suitable manner; for instance, the upper press member 5 may carry a pair of rods 7 which are slidably received in elongated recesses 8 formed within the lower member 6.

The lower press mmeber 6 is formed with a boss which may be a separate element 9 having a cylindrical base 10, a conical intermediate portion 11, and a cylindrical upper portion 12. The base 10 is arranged within a cylindrical recess 13 of the member 6, and a screw or other suitable retaining device 14 is provided for securing the boss 9 against axial displacement relative to the member 6. The screw is formed with a head 14a and a shank 14b which is threaded into the base 10 of the boss 9, and the member 6 is formed with a central bore 8a, 8b adapted to receive the screw head and shank with clearance. The screw head is formed with a polygonal opening 14c adapted to receive a suitable key (not shown) so that the screw may be turned.

Suitable means are provided for preventing rotation of the boss 9 relative to the lower press member 6. This may be accomplished by forming the base 10 and the member 6 with bores 15 which, when they are in alignment with each other, are adapted to receive a pin 16.

The upper press member 5 is formed with a recess 17 which is adapted to receive therewithin the portions 11 and 12 of the boss 9. The upper part of the recess 17 is circular and has a diameter substantially equal to that of the upper portion 12. In this way, the slide mounting offered by the rods 7 is supplemented, and the boss 9 is accurately positioned relative to the upper press member 5.

The members 5 and 6 are so shaped as to be adapted to receive a tubular work piece between themselves in such a manner that the work piece encompasses the boss 9. For example, the lower face 5a of the upper press member 5 may be formed with a recess 5b which is adapted to receive a flanged tubular work piece corresponding to the shape of the synchromesh gear to be formed.

In order to shape the outer gear ring 2, the upper press member 5 is formed, in the region of the recess 5b, as an annular die 3a, whereas the intermediate portion 11 of the boss 9 is formed with longitudinal ridges as an annular die 4a for forming the inner grooving 4. Each of the dies may originally be formed by a specially hardened master die which may be used to produce the dies of a number of different presses.

By virtue of the above arrangement, not only the shape of the outer gear ring 3 and the inner grooving 4 but also their relative angular position will be produced with a very high degree of accuracy, and the maximum obtainable degree of accuracy is increased by slidably arranging the boss 9 within the recess 13 of the upper press member 5, as set forth above.

Preferably, the press members 5 and 6 are so shaped that when the same are brought toward each other with a tubular work piece between themselves until the dies have formed the inner and outer gear rings, the press members 5 and 6 leave spaces between themselves within which fins, i.e., pressed out material formed as the result of press-forming of the work piece, can be accommodated. The spaces may include a tubular space 18 which is a continuation of the tubular work piece and a flat annular space 19 lying in a plane substantially normal to the axis of the work piece, which space 19 is a continuation of the flange of the work piece.

The press members 5 and 6 are moved by any suitable power means (not shown). Also, a suitable ejector mechanism may be provided for ejecting the finished work piece. This mechanism may include a pair of ejector rods 20 slidably arranged within bores 21 formed in the lower press member 6, which rods 20 are attached to a common operating member 22, so that upward movement of the member 22 relative to the member 6 will cause a work piece resting on the upper face 6a of the member 6 to be removed.

It will be seen from the above that the press shown in FIG. 3 is capable of producing a finished synchromesh gear from a tubular work piece by press-forming the outer gear ring as well as inner longitudinal grooving.

It will be understood that each of the elements described above, or two or more together, may also find a useful application in other types of presses and press-formed products differing from the types described above.

While the invention has been illustrated and described as embodied in a synchromesh gear as well as a method and apparatus for making the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A metal forming press for pressforming from an annular blank a gear having an outer gear crown and inner longitudinal grooves, said press comprising, in combination, a first die having an engaging face and formed with a guide recess opening in said engaging face and an annular forming recess surrounding said guide recess and opening also in said engaging face, said annular forming recess having a gear ring-shaped outer annular face surrounding said annular forming recess for forming said outer gear crown; and a second die having an engaging face adapted to abut against said engaging face of said first die and to close said annular forming recess therein during press forming, said second die including a boss part having a guiding end portion matching said guide recess and slidably engaging the same, and a forming portion concentric with said forming recess in said first die, said forming portion having an outer annular face having longitudinal ridges for forming said inner grooves in said annular blank, said guiding end portion of said boss part having a greater length in direction of said boss part than said forming recess in said first die so that said guiding end portion and said guiding recess engage each other to center said forming portion of said boss relative to said forming recess before said forming portion of said boss is located in said forming recess opposite said gear ring-shaped annular face.

2. A press as set forth in claim 1 wherein said second die includes a main body with a holding recess; and wherein said boss part has another end portion fitting into and secured in said holding recess.

3. A press as set forth in claim 2 and including threaded means engaging said main body and said other end portion of said boss part for urging said other end portion into said holding recess; and means engaging said main body and said other end portion eccentric to said outer annular surface of said forming portion of said boss part to prevent turning movement of said boss part.

4. A metal forming press for pressforming from an annular blank a gear having an outer gear crown and inner longitudinal grooves, said press comprising, in combination, a first die having an engaging face and formed with a guide recess having a cylindrical end portion and a conical portion opening in said engaging face and an annular forming recess surrounding said guide recess and opening also in said engaging face, said annular forming recess having a gear ring-shaped outer annular face surrounding said annular forming recess for forming said outer gear crown; and a second die having an engaging face adapted to abut against said engaging face of said first die and to close said annular forming recess therein during press forming, said second die including a boss part having a guiding end portion including a cylindrical portion and a conical portion matching said guide recess and slidably engaging the same, and a forming portion concentric with said forming recess in said first die, said forming portion having an outer annular face having longitudinal ridges for forming said inner grooves in said annular blank, said guiding end portion of said boss part having a greater length in direction of said boss part than said forming recess in said first die so that said guiding end portion and said guiding recess engage each other to center said forming portion of said boss relative to said forming recess before said forming portion of said boss is located in said forming recess opposite said gear ring-shaped annular face.

5. A metal forming press for pressforming from an annular blank a gear having an outer gear crown and inner longitudinal grooves, said press comprising, in combination, a first die having an engaging face and formed with a guide recess opening in said engaging face and an annular forming recess surrounding said guide recess and opening also in said engaging face, said annular forming recess having a gear ring-shaped outer annular face surrounding said annular forming recess for forming said outer gear crown; and a second die having an engaging face adapted to abut against said engaging face of said first die and to close said annular forming recess therein during press forming, said second die including a boss part having a guiding end portion matching said guide recess and slidably engaging the same, and a forming portion concentric with said forming recess in said first die, said forming portion having an outer annular face having longitudinal ridges for forming said inner grooves in said annular blank, said guiding end portion of said boss part having a greater length in direction of said boss part than said forming recess in said first die so that said guiding end portion and said guiding recess engage each other to center said forming portion of said boss relative to said forming recess before said forming portion of said boss is located in said forming recess opposite said gear ring-shaped annular face, said engaging faces of said first and second dies defining a flat chamber extending outwardly from said forming recess and in substantially radial direction to said gear ring-shaped annular face, said first and second dies defining another narrow tubular chamber communicating with said forming recess and surrounding part of said guiding end portion of said boss part, said other chamber extending in substantially axial direction to said gear ring-shaped face, said chambers being adapted to receive surplus material displaced during forming of said gear from said blank.

6. A metal forming press for pressforming from an annular blank a gear having an outer gear crown and inner longitudinal grooves, said press comprising, in combination, a first die having an engaging face and formed with a guide recess having a cylindrical end portion and a conical portion opening in said engaging face and an annular forming recess surrounding said guide recess and opening also in said engaging face, said annular forming recess having a gear ring-shaped outer annular face surrounding said annular forming recess having a gear ring-shaped outer annular face surrounding said annular forming recess for forming said outer gear crown; and a second die having an engaging face adapted to abut against said engaging face of said first die and to close said annular forming recess therein during press forming, said second die including a boss part having a guiding end portion including a cylindrical portion and a conical portion matching said guide recess and slidably engaging the same, and a forming portion concentric with said forming recess in said first die, said forming portion having an outer annular face having longitudinal ridges for forming said inner grooves in said annular blank, said guiding end portion of said boss part having a greater length in direction of said boss part than said forming recess in said first die so that said guiding end portion and said guiding recess engage each other to center said forming portion of said boss relative to said forming recess before said forming portion of said boss is located in said forming recess opposite said gear ring-shaped annular face, said engaging faces of said first and second dies defining a flat chamber extending outwardly from said forming recess and in substantially radial direction to said gear ring-shaped annular face, said conical portions of said boss part and of said guide recess defining another narrow tubular chamber communicating with said forming recess and surrounding said conical portion of said guiding end portion of said boss part, said other chamber extending in substantially axial direction to said gear ring-shaped face, said chambers being adapted to receive surplus material displaced during forming of said gear from said blank.

References Cited in the file of this patent

UNITED STATES PATENTS

| | | |
|---|---|---|
| 219,202 | Blancard | Sept. 2, 1879 |
| 551,064 | Tyler | Dec. 10, 1895 |
| 596,405 | Hart | Dec. 28, 1897 |
| 872,168 | Clark | Nov. 26, 1907 |
| 874,448 | Smith | Dec. 24, 1907 |
| 1,142,782 | Carlson | June 8, 1915 |
| 1,278,746 | Prouty | Sept. 10, 1918 |
| 1,286,642 | Hudson | Dec. 3, 1918 |
| 1,332,968 | Beall | Mar. 9, 1920 |
| 1,352,911 | Paque | Sept. 14, 1920 |
| 1,428,219 | Crawford | Sept. 5, 1922 |
| 1,434,190 | Bird | Oct. 31, 1922 |
| 1,454,508 | Eckert | May 8, 1923 |
| 1,512,695 | Keller | Oct. 21, 1924 |
| 1,688,421 | Holmes | Oct. 23, 1928 |
| 1,726,442 | Lynch | Aug. 27, 1929 |
| 1,785,731 | Dronsfield | Dec. 23, 1930 |
| 1,883,079 | Strickland | Oct. 18, 1932 |
| 2,126,814 | Rest | Aug. 16, 1938 |
| 2,184,949 | Schwartz | Dec. 26, 1939 |
| 2,393,628 | Goldie | Jan. 29, 1946 |
| 2,598,191 | Penn | May 27, 1952 |
| 2,688,793 | Carlson | Sept. 14, 1954 |
| 2,713,277 | Kaul | July 19, 1955 |
| 2,759,380 | Bauer et al. | Aug. 21, 1956 |
| 2,814,101 | Prough | Nov. 26, 1957 |

FOREIGN PATENTS

| | | |
|---|---|---|
| 138,007 | Australia | July 18, 1950 |
| 464,276 | Germany | Aug. 15, 1928 |
| 576,747 | Germany | May 16, 1933 |